US011126963B2

(12) United States Patent
Burrows et al.

(10) Patent No.: US 11,126,963 B2
(45) Date of Patent: Sep. 21, 2021

(54) SYSTEM AND METHOD FOR SUPPLY CHAIN COMPLIANCE

(71) Applicant: FAIR FACTORIES CLEARINGHOUSE INC., New York, NY (US)

(72) Inventors: Peter William Burrows, Marshfield, MA (US); Shital Pranav Patel, Rocky Hill, CT (US); John Paul N. Simpao, Hicksville, NY (US); Brendan Michael McMahon, Middlesex, VT (US)

(73) Assignee: FAIR FACTORIES CLEARINGHOUSE INC., New York, NY (US)

( * ) Notice: Subject to any disclaimer, the term of this patent is extended or adjusted under 35 U.S.C. 154(b) by 193 days.

(21) Appl. No.: 15/590,649

(22) Filed: May 9, 2017

(65) Prior Publication Data
US 2017/0323265 A1    Nov. 9, 2017

Related U.S. Application Data

(60) Provisional application No. 62/333,414, filed on May 9, 2016.

(51) Int. Cl.
*G06Q 10/08* (2012.01)
*G06Q 10/06* (2012.01)
*G06F 16/438* (2019.01)

(52) U.S. Cl.
CPC ....... *G06Q 10/0875* (2013.01); *G06F 16/438* (2019.01); *G06Q 10/0635* (2013.01); *G06Q 10/0639* (2013.01); *G06Q 10/06312* (2013.01); *G06Q 10/06375* (2013.01); *Y02P 90/845* (2015.11)

(58) Field of Classification Search
CPC ......... G06Q 10/0875; G06Q 10/06312; G06Q 10/0635; G06F 16/438
USPC ............... 705/29, 333, 317, 7.28, 7.38, 36 R
See application file for complete search history.

(56) References Cited

U.S. PATENT DOCUMENTS

| 7,716,077 B1* | 5/2010 | Mikurak ................ G06Q 10/06 705/7.12 |
| 8,027,930 B2* | 9/2011 | Smith .................... G06Q 40/08 705/317 |
| 2003/0093340 A1* | 5/2003 | Krystek ........... G06Q 10/06315 705/28 |
| 2005/0071207 A1* | 3/2005 | Clark .................... G06Q 10/06 705/7.38 |

(Continued)

OTHER PUBLICATIONS

International Search Report for International Application No. PCT/US2017/031734, dated Jul. 19, 2017.

*Primary Examiner* — Vanel Frenel
(74) *Attorney, Agent, or Firm* — Lathrop GPM LLP (57) ABSTRACT

Disclosed is a compliance database and management system for auditing, assessing, and tracking the compliance of companies and their suppliers and method for performing the same. A method for performing supply chain compliance includes collecting supply chain data, such as information about one or more suppliers, compiling (e.g., building) the supply chain data (e.g., into a database) and providing the compiled supply chain data so that the data is accessible to a user. The compiled supply chain data can be analyzed, filtered by one or more parameters, organized by one or more parameters, or a combination thereof by a user.

13 Claims, 5 Drawing Sheets

(56) References Cited

U.S. PATENT DOCUMENTS

| | | | |
|---|---|---|---|
| 2005/0120039 A1* | 6/2005 | Amys | G06Q 10/10 |
| 2007/0185751 A1* | 8/2007 | Dempers | G06F 19/326 |
| | | | 705/7.29 |
| 2008/0040207 A1* | 2/2008 | McKay | G06Q 10/1097 |
| | | | 705/7.21 |
| 2010/0131341 A1* | 5/2010 | McKay | G06Q 10/063112 |
| | | | 705/7.41 |
| 2010/0287036 A1* | 11/2010 | Guinta | G06Q 10/063 |
| | | | 705/7.32 |
| 2012/0209890 A1 | 8/2012 | Nowacki et al. | |
| 2013/0085801 A1* | 4/2013 | Sharpe | G06Q 10/06311 |
| | | | 705/7.28 |
| 2013/0090961 A1 | 4/2013 | Smith | |
| 2013/0332376 A1* | 12/2013 | Pilon | G06Q 10/00 |
| | | | 705/317 |
| 2014/0222521 A1* | 8/2014 | Chait | G06Q 10/0637 |
| | | | 705/7.36 |
| 2015/0046363 A1* | 2/2015 | McNamara | G06Q 10/0635 |
| | | | 705/333 |
| 2015/0356503 A1* | 12/2015 | LaVoie | G06Q 10/04 |
| | | | 705/338 |
| 2018/0182008 A1* | 6/2018 | Barday | G06Q 10/063114 |

* cited by examiner

SYSTEM AND METHOD FOR SUPPLY CHAIN COMPLIANCE

CROSS-REFERENCE TO RELATED APPLICATIONS

The present application claims priority to Provisional Patent Application No. 62/333,414, entitled "System and Method For Supply Chain Compliance," filed May 9, 2016, which is herein incorporated by reference in its entirety.

FIELD OF THE INVENTION

The present invention relates to computer network-based systems and methods for audit management, empowering collaboration to leverage improvements in supply chains.

BACKGROUND

Corporate compliance is a cost center that fights for corporate investment, against other important corporate priorities. Incurred costs include, for example, the cost of developing or licensing a compliance database and management system, as well as the cost of implementing such systems to monitor and manage supplier compliance. Moreover, redundant auditing often occurs, because each corporation using a supplier generally has its own systems and conducts independent audits. There is therefore a need for systems and methods to reduce costs and facilitate informed supply chain compliance management.

SUMMARY OF THE INVENTION

The present invention is related to a compliance database and management system. The system allows each company (e.g., a user) to audit, assess and track the compliance of its suppliers. Also disclosed are methods for performing supply chain compliance. In at least some embodiments, the compliance database and management system allows one or more company users to collaborate with other company users that utilize or share the same suppliers. Collaboration with other companies sharing the same suppliers can increase effectiveness because it may provide additional visits and insights into actual supplier conditions and help companies establish better practices. However, collaboration between companies that are direct competitors raises the risk of anti-trust enforcement if the collaboration system is not designed properly, and formal anti-trust protocols are established.

In one embodiment, the present invention relates to a method for performing supply chain compliance. The method for performing supply chain compliance comprises collecting supply chain data, wherein the supply chain data comprises information about one or more suppliers. The method also comprises compiling (e.g., building) the supply chain data (e.g., into a database) and providing the compiled supply chain data so that the data is accessible to a user. The compiled supply chain data is analyzed, filtered by one or more parameters, organized by one or more parameters, or a combination thereof. The compliance database is configured to dynamically change based on one or more parameters stored in the compliance database.

As disclosed herein, the supply chain data is compiled and built into a database. This information can be used to build or develop an audit plan for a supplier based on the statistical analysis of the compiled data. For example, aggregated statistical data can be used to prioritize supplier inspections based on highest risks based on previous experience in certain locations.

Additionally or alternatively, the supply chain data can be filtered, organized and/or prioritized based on risk. A risk assessment is tailored to a specific user or company and will help determine what suppliers to audit.

In some aspects, the supply chain data comprises demographic information, facility description information, management information, employee health information, and security information, labor information, or a combination thereof of one or more suppliers. In one aspect, the demographic information of the one or more suppliers comprises a geographic location information. In another aspect, the method of supply chain compliance further comprises mapping the supply chain compliance data based on the geographic location.

In some aspects, compiling the supply chain data comprises preventing one or more duplicate suppliers based on one or more supplier attributes.

In some aspects, the method further comprises implementing one or more codes of conduct to identify one or more suppliers, wherein the code of conduct defines one or more rules that a company implements to identify a supplier. The code of conduct can identify different suppliers and conditions from supply chain data from the one or more companies.

In some aspects, before an audit is conducted the company must determine who is going to conduct the audit. This could be an external firm that is proficient in the type of audit performed or could be an internal staff member that is available to conduct this work. The system and methods described herein facilitates the selection of these workers, provides a way for them to accept or reschedule the work requested, and then provides a messaging system to communicate with the worker assigned until the assessment work is complete.

In some aspects, the method further comprises inputting scheduling data into an interactive, virtual calendar, wherein the scheduling data comprises audits, training, supplier meetings, supplier visits, or a combination thereof.

In some aspects, the method further comprises facilitating supply chain collaboration between the one or more companies. For example, the step of facilitating collaboration can comprise reviewing audit data from a first company and reviewing audit data from a second company, allowing a plurality of companies to work on a single audit, allowing one or more companies to work on a corrective action plan (e.g., after each of the one or more companies has conducted independent audits in a supplier facility), or a combination thereof.

In some aspects, the method further comprises monitoring the supply chain data, wherein the step of monitoring comprises receiving audit result data and generating an action plan based on the audit result data. Supply chain data can comprise, for example, audit data, factory data, audit scheduling data, failed conditions data, length of time to close audits, list of countries, number of active factories, total number of factories, failed conditions data, shared data with another, or a combination thereof.

In some aspects, the analyzed data is scored according to risk or severity. In some aspects, each of the one or more suppliers is ranked by a classification scheme defined by the user. In other aspects, the system can track trend of a factory's (e.g., supplier's) compliance performance over time.

In some aspects, the method comprises inputting scheduling data into an interactive, virtual calendar.

BRIEF DESCRIPTION OF THE DRAWINGS

Specific examples have been chosen for purposes of illustration and description, and are shown in the accompanying drawings, forming a part of the specification.

DETAILED DESCRIPTION

Throughout this application, various patents, patent applications, and publications are referenced. The disclosures of these patents, patent applications, and publications in their entireties are hereby incorporated by reference into this application to more fully describe the state of the art as known to those skilled therein as of the date of the invention described and claimed herein. The instant disclosure will govern in the instance that there is any inconsistency between the patents, patent applications, and publications and this disclosure.

As used herein, "supply chain" can refer to any number of suppliers and/or related parties. For example, "supply chain" includes, without limitation, all direct and indirect suppliers and any and all related parties such as agents, licensees, subsidiary companies, and supplier's suppliers (e.g., raw material suppliers, subcontractors, farms, mills and others).

Categories of supply chain data, such as data collected in factory profile information, self-assessment and audits can include, for example, and without limitation, Above-ground/Underground Storage; Accountability; Accounting; Air Emissions; Aisles and Exits; Anti-corruption; Assessment and Monitoring; Audit Information; Auditing Company Information; Benefits and Leave; Best Practices; Building Adequacy/Structural Integrity; Building Integrity; Business Partner Requirement; Carbon Fiber (Only for carbon fiber manufacturers); Cargo Vendor Security; Chemicals & Ventilation; Child Labor; Code Awareness; Code of Conduct; Coercion and Harassment; Community; Compensation and Benefits; Compliance with Laws; Conflict Mineral Questions; Container and Trailer Security/Conveyance; Contractor Controls; Control of Suppliers/Subcontractors and Sub-Suppliers; C-TPAT; Customs Compliance; Disciplinary Practices; Discrimination; Discrimination, harassment and grievance procedures; Document Control; Dormitories (if applicable); Effluent Guidelines; Electrical Safety Assessment; Emergency Preparedness and Fire Safety; Emissions—EMISSIONS TO AIR; Emissions—NOISE & NUISANCE; Emissions—SOIL & GROUNDWATER CONTAMINATION; Emissions—WASTE; Emissions—WASTEWATER/EFFLUENT; EMPLOYEE ENVIRONMENT; Employee Relationships; Employment Site Contact Details; Employment Status; Energy Efficiency; Energy Management; Engineering; Entitlement to Work; Environmental Permits & Legal Requirements; Environmental Protection; Export Logistics; Facility and Cargo Security Practices; Facility Information; Facility Security; Factory Demography; Factory Structure; Fair Wages; Fire Safety; First Aid; Forced Labor, Slavery and Human Trafficking; Forced, bonded, indentured & prison labor; Freedom of Association; Freedom of Association & Collective Bargaining; Freedom Of Association And Collective Bargaining; Freedom of association and right to collective bargaining; Freedom of Association and Right to Organise; Freedom of Association/Collective Bargaining; General Information; GHG and Other Air Emissions Management; Grievances, Discipline, Coercion and Harassment; H. Disciplinary Practices; Harassment and Disciplinary Practices; Harassment or Abuse; Hazardous Materials—CHEMICAL MANAGEMENT; Hazardous Materials—CHEMICAL STORAGE, HANDLING and TRANSPORT; Hazardous Materials—LEGAL STANDARDS; Hazardous Materials—OZONE DEPLETING SUBSTANCE; Hazardous Materials—RESTRICTED SUBSTANCES; Hazardous Materials—RISK MANAGEMENT & EXPOSURE; Hazardous Materials Releases; Health and Safety; Health and Safety—RISK MANAGEMENT & EXPOSURE; Higg/Data Validation; Hiring and Termination; HIRING AND TERMINATION; Hours of Work; HR Management and Code of Conduct; HS (Health & Safety); HSE; Human Resources; Industrial Relations; Industrial Relations and Freedom of Association; Information Access Control; Information Technology Security; Informed Workplace; INTERNATIONAL ASSESSMENT REPORT—ONSITE; Interview; Issue Type; Labor Management Systems; Labor Performance; Legal Compliance; Legal Compliance; Legal Requirements; Lighting; Living Wages Are Paid; M. Best Practices; Management Commitment Evaluation; Management of Layoffs and Redundancies; Management of SA; Management Systems; Management Systems—Health and Safety; Management Systems—Process Chemicals; Management Systems and Continuous Improvement; Management Systems Evaluation; Managing Hours; Manufacturer Identification; Mgmt. Systems—Environmental Mgmt. System; Monitoring & Documentation; Monitoring and Compliance; Monitoring Standards; NARRATIVE SUMMARY; Natural Environment; Noise Pollution (Boundary Noise only); Occupational Health and Safety; Other Findings; Other Key Performance Indicators; Other Laws; Other Laws and Workplace Regulations; Others; Payroll; Personal Protective Equipment; Personnel Security; Physical Access Controls; PHYSICAL PRODUCTION; Physical Security; Physical Working Conditions; Policies and Permits; Principles of Monitoring; Privacy Issues; Procedural Security; Production/Manufacturing; Protection of the Environment; Protection of the Environment; Protection of vulnerable workers; Quality Control; Records & Documentation; Recruitment and Hiring; Recruitment, Hiring and PD; Regular Employment; Regular Employment Is Provided; Sample Income; Sanitation and Hygiene; Security Training and Threat Awareness; Self-Assessment; Service Providers; Shipment Information Controls; Site Structure and Environmental Aspects; Social Compliance Experience & Maturity; Social Responsibilities; Social Responsibility; SOURCING; Storage & Distribution; Structural Safety Assessment; Structural, Mechanical, Electrical Integrity; SUBCONTRACTING; Subcontracting and Home Working; Subcontractors; Supplier Performance Tier Rationale; Supply Chain; Sustainable Resource Use—ENERGY USE; Sustainable Resource Use—WATER USE; Sustainable Resource Use—MATERIALS & PACKAGING; Termination & Retrenchment; Terms and Conditions; There Is No Harsh Or Inhumane Treatment; Threshold Assessment; Threshold Issues; Toilets, Drinking Water, and Kitchens; Trading Agent or Supplier Identification; Training; Transparency and Integrity; Treatment of Workers; Unauthorized Subcontracting; Union; Vendor Agreement; Vendor Compliance; Ventilation and Temperature; Wages, Benefits & Overtime; Water Management; Women's Rights; Worker Complaint; Worker Engagement; Worker Interview Summary; Worker Residence (Dormitory); Workforce Analysis; Workforce Details; Working Conditions; and Workplace Conduct & Discipline.

Supply chain data can be any data obtained from a company (e.g., a user) or from one or more suppliers. For example, an affidavit of practices based on a supplier self-assessment is a type of supply chain data. The self-assessment data can include but is not limited to facility description, management processes, and employee health and security measures. The demographic info of supplier, child labor information, and geographic location of the supplier are other examples of supply chain data. Other examples, that may or may not fall into one of the supply chain data categories described above can include, for example, audit data (audit information), factory data, audit scheduling data, failed conditions data, length of time to close audits, list of countries, number of active factories, total number of factories, failed conditions data, shared data with another, or a combination thereof.

Figure 1:
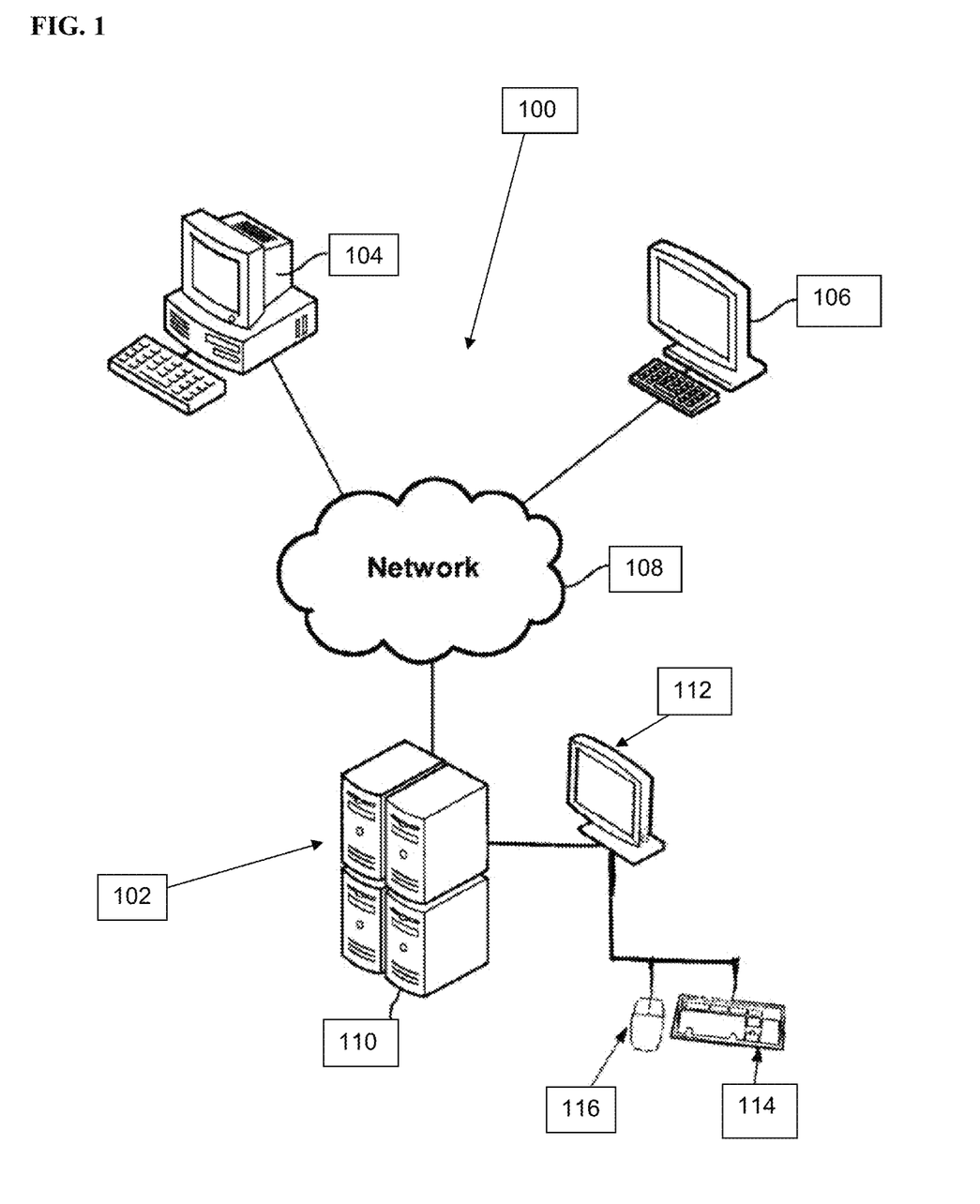
FIG. 1 illustrates one example of a compliance database and management system of the present disclosure.

FIG. 1 illustrates one example of a compliance database and management system 100. The compliance database and management system 100 can include at least one host computing device 102, at least a first company user device 104, and optionally at least a second company user device 106, which can all be communicatively connected through at least one network 108.

The at least one network 108 can be a local area network (LAN), a wide area network (WAN) 104, such as the Internet, or a combination of one or more LANs and a WANs.

Figure 2:
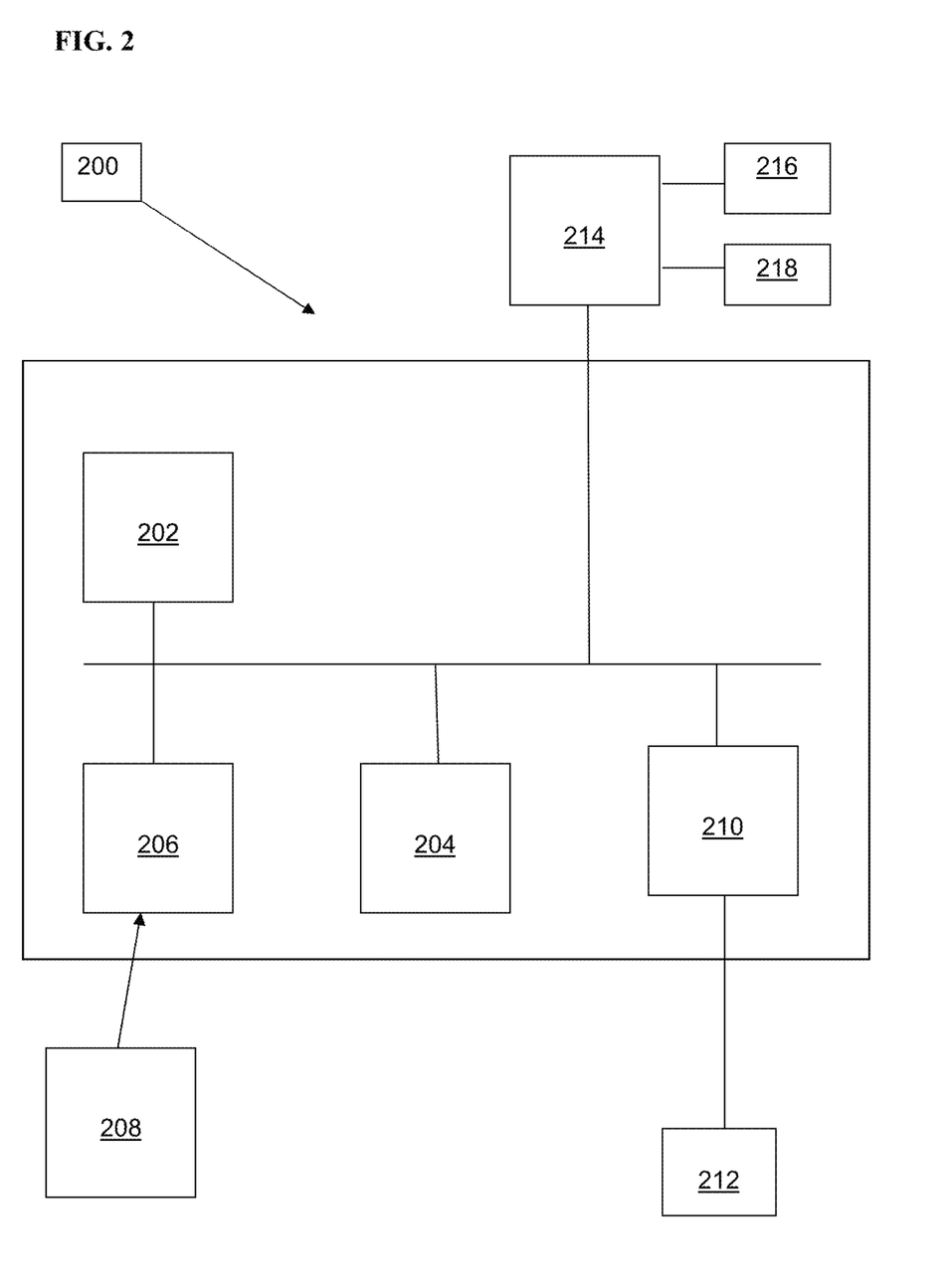
FIG. 2 illustrates one example of a computing device that can be used in the compliance database and management system of FIG. 1.

As shown, the at least one host computing device 102 can include at least one server 110, which can be operatively connected to a host graphical user interface 112, and at least one host input device, such as keyboard 114 or mouse 116. Indeed, each host computing device and each company user device can be a computing device as shown in FIG. 2. FIG. 2 illustrates a computing device 200 that can include a processor 202 that controls the overall operation of the computing device 200. Computing device 200 can also include at least one non-transient computer-readable storage medium, such as memory 204, and/or at least one removable memory drive 206 that receives and reads a removable memory 208. Removable memory drive 206 can be any suitable removable memory drive that receives and reads a removable memory 208, such as a magnetic disk drive, an optical disk drive, and a USB port. Computing device 200 can further include a network interface that communicatively connects the computing device 200 to a network 212. Moreover, computing device 200 can include a graphical user interface 214, and at least one user input device such as a keyboard 216 or a pointing device 218. Pointing device 218 may be implemented with a hard-wired or wireless mouse, track ball, pen device, or similar device.

Referring to FIGS. 1 and 2, a compliance database and management system 100 of the present technology can be implemented by causing at least one processor in the compliance database and management system, such as a processor 202 of at least one server 110 of a host computing device 102, to execute instructions stored on a non-transient computer-readable medium, such as memory 204 or removable memory 208. The instructions, when executed by the processor, can cause the processor to perform the steps described below for conducting one or more compliance management actions, including causing the host computing device 102 to provide communications to, and receive communications from, at least the first company user device 104 via the network 108. While the host and company users are discussed below as having a computing device, the examples are not limited by the actual number of computing devices used by each, and that each can have more than one computing device.

Compliance database and management systems of the present technology can be used to track various stages of ethical sourcing practices, including but not limited to social responsibility, environmental stability, health and safety, legal compliance, cargo security and living wages.

Figure 3:
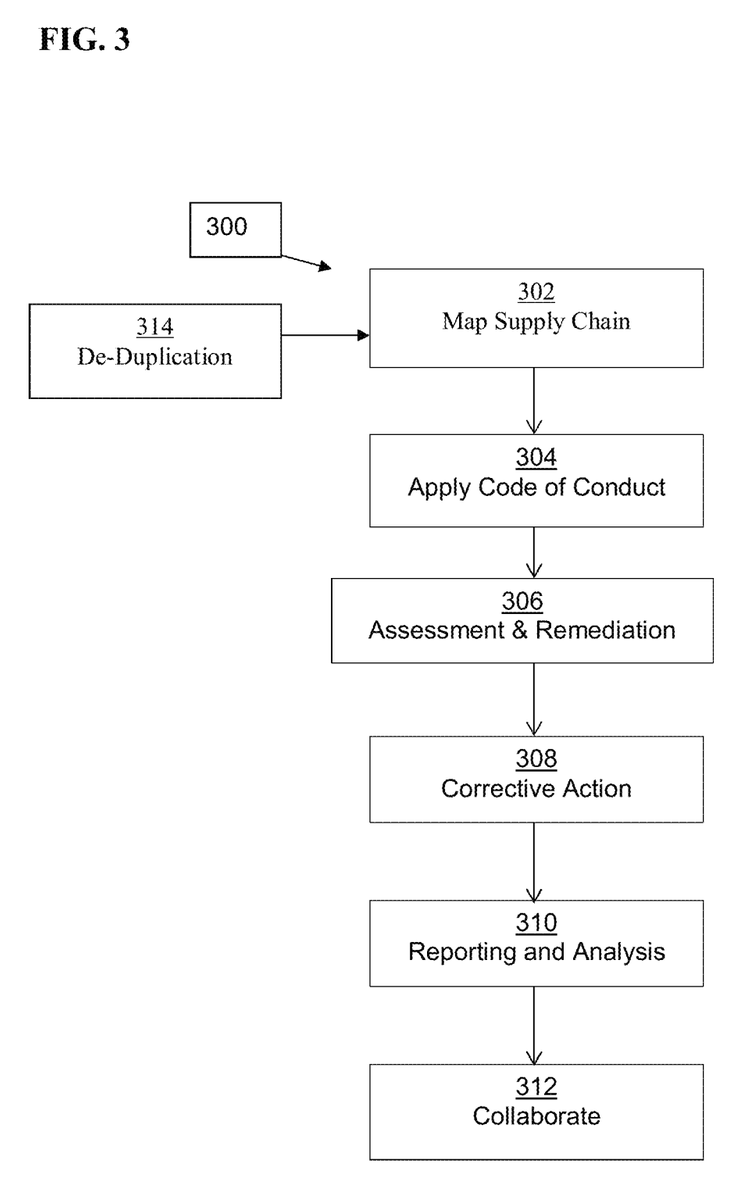
FIG. 3 illustrates one compliance database and management method of the present disclosure.
Figure 4:
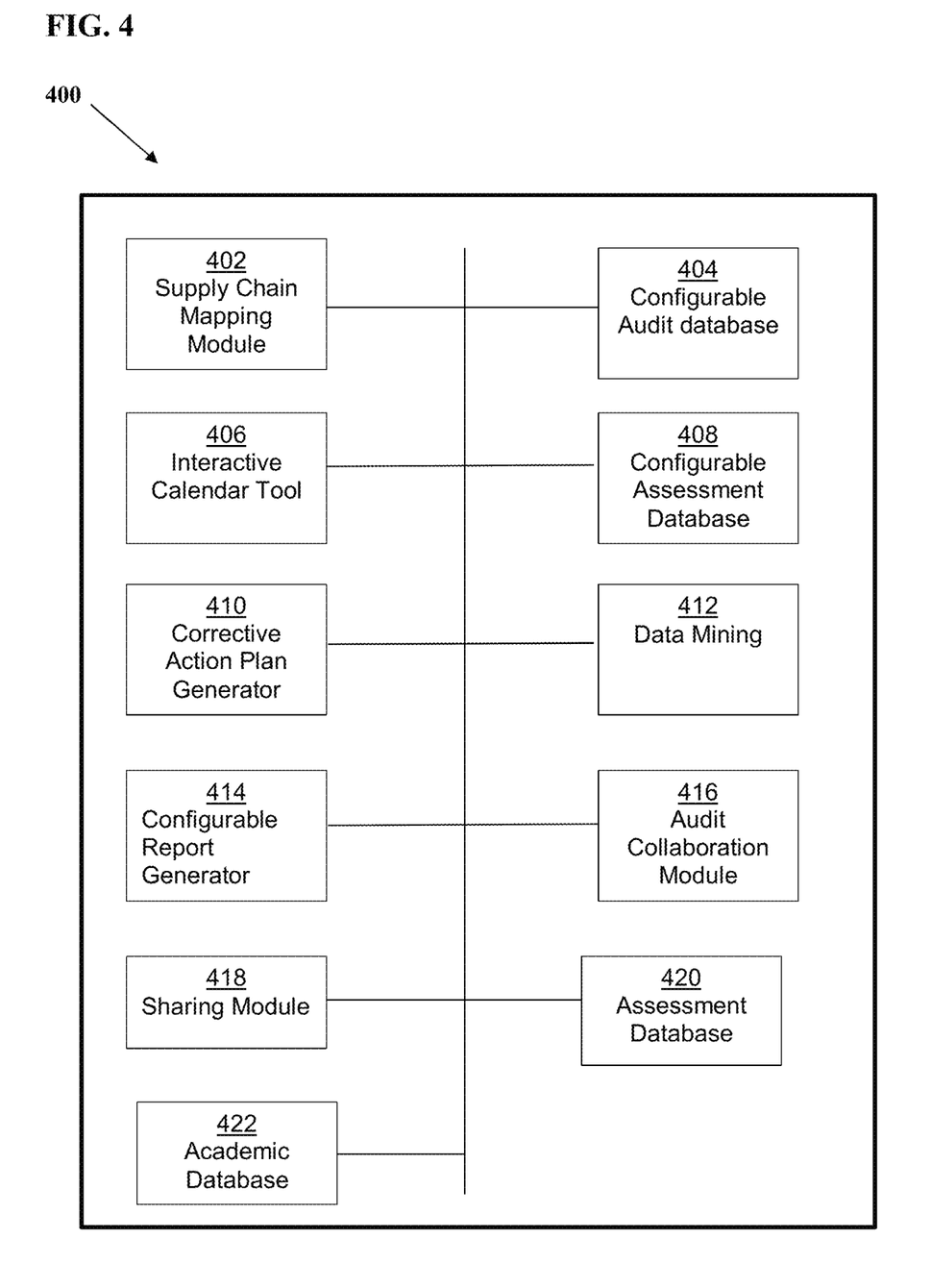
FIG. 4 illustrates one example of a server of a host computing device of the compliance database and management system of FIG. 1.

FIGS. 3 and 4 illustrate one method 300 of implementing a compliance database and management system of the present technology. As shown, at least one server 400 of host computing device 102 of a compliance database and management system may contain several modules that perform various compliance monitoring and management functions. In each of the steps provided below, the host computing device 102 may store any information received from the first company user device 104 in non-volatile memory.

At step 302, the compliance database and management system 100 may perform a step of mapping the company user's supply chain. In this step, the server 400 may include a supply chain mapping module 402, which may receive input from the first company user device 104 that identifies one or more suppliers in the company user's supply chain. The server 400 may perform de-duplication 314 as a part of the supply chain mapping step 302, which may include identifying and removing duplicate supplier entries. The supply chain mapping module 402 may provide one or more graphical depictions of the company user supply chain to the first company user device 104. For example, the supply chain mapping module 402 may generate a visual display of the first company user's supply chain. In one example, the visual display may include a global map on which countries of supplier locations are highlighted. In such an example, if the first company user scrolls over or clicks on a highlighted country, supplier detail information for any suppliers in that country may be supplied to the first company user via the graphical user interface.

At step 304, the compliance database and management system 100 may perform a step of applying a code of conduct. In this step, the server 400 may receive input from the first company user device 104 defining one or more rules of conduct that the first company user desires to apply to the identified suppliers. The server 400 may also include a configurable audit database 404, and may receive audit generation instructions from the first company user device 104 selecting one or more predefined audit parameters stored in the configurable audit database 404, and/or defining one or more custom audit parameters. The audit questions in the configurable audit database 404 may include nested questions, which may allow an audit to change dynamically, presenting questions or not, depending upon conditions. The server 400 may generate an audit for use by the first company user from the input audit instructions.

At step 306, the compliance database and management system 100 may perform a step of assessment and remediation. The server 400 may include and provide to the first company user an interactive calendar tool 406. The first company user may input scheduling data into the interactive calendar tool 406, to schedule events such as audits, training, meetings with a supplier, and supplier visits. The server 400 may also include and provide to the first company user a configurable assessment database 408. The server 400 may receive assessment generation instructions from the first company user device 104 selecting one or more predefined assessment parameters stored in the configurable assessment database 408, and/or defining one or more custom assessment parameters. The server 400 may generate an assessment questionnaire for use by the first company user from the input assessment instructions.

At step 308, the compliance database and management system 100 may perform a step of defining and monitoring corrective action. For example, the server 400 may include and provide to the first company user a corrective action plan generator 410, which can receive audit result data and generate a corrective action plan based on the audit result data. The server 400 may also include and provide to the first company user one or more data mining tools. The one or more data mining tools may provide statistics and/or assessment information, which may track progress of suppliers with respect to implementing corrective action plans or provide other information regarding supplier compliance.

At step 310, the compliance database and management system 100 may perform a step of reporting and analysis. For example, the server 400 may include and provide to the first company user a configurable report generator 414, which may generate one or more reports based on the audit result data, or any other data input by the first company user or generated by the system. In some examples, the first company user may create public and/or private reports to manage workload, track performance, and communicate with stakeholders. The generated reports may be exported from the system for use by the company user.

At step 312, the compliance database and management system 100 may perform a step of facilitating collaboration between the first company user and at least a second company user. For example, the server 400 may include and provide to the first company user an audit collaboration module 416, which may allow a first company user and a second company user, or any plurality of company users, to co-audit a supplier. The server 400 may include and provide to the first company user a sharing module 418, which may allow a first company user to post audit results to the module or read the audit results of a second company user from the module. Collaboration may be conducted under protocols approved by the U.S. Department of Justice to avoid antitrust risks of direct competitors working together.

As discussed above with respect to step 308, the compliance database and management system 100 may include one or more data mining tools. The data mining tools may cause the compliance database and management system 100 to generate and display reports or other graphical results showing analyzed data for a selected month or date range. The data mining tools may include both real time and historical times series data comparisons. The data mining tools may also include drill-down data is available for download of report data in multiple formats. Any information generated by the data mining tools may be stored in a non-volatile memory of the compliance database and management system 100.

Some examples of analyzed data that may be generated by the one or more data mining tools include, but is not limited to: Audits completed this month by audit type/audit scope; Number of factories with audits older than certain date; Audits scheduled/completed this month by audit scope—"Status of scheduled audits"; Number of overdue action items, also called Corrective Action Plans (CAPs) whose deadlines dates have passed; Number and type of audits; Number of new factories and organizations; Created/activated/deactivated this month by industry type; Out of all scheduled audits, % that were completed; Top ten failed conditions this month; How long did it take to close the audits this month/year. i.e. complete all the CAPs; Number of and types of open issues; List of all countries and corresponding active factories of a member (2 different displays—map and bar chart); List or total number of factories by company designation; Summary of failed conditions (CAPs) by country and/or by specific condition; What percentage overlap does a member's factory list have with other FFC members.

The audit management system disclosed herein provides a secure web-based tool to track workplace conditions in an efficient and cost-effective way.

Also, the analyzed data can be scored according to risk or severity.

The audit management system can allow a user to: Manage factory/farm/workplace data, including contacts, Deploy detailed factory profiles, Create customized audit questionnaires, Request, schedule, deploy and record assessments, Record audit results offline, Manage product information and map supply chain with workplace performance, Store audit/assessment documents, Create and communicate factory/farm/workplace evaluation designation, Analyze workplace/supply chain information, Provide access to collaborating members/companies to coordinate in assessment and remedial activities, Certain membership levels have unlimited logins, Reporting available on almost every data element in the platform, and/or Internal auditors of a Full Member can use the FFC Tablet Application for Android and iOS to insert audit data in the FFC Application.

Each company user may select which of the one or more data mining tools it desires to use, and the selected data mining tools may be added to a dashboard provided by the system to the company user. In at least some examples, any content generated by the data mining tools may be exported from the system.

Figure 5:
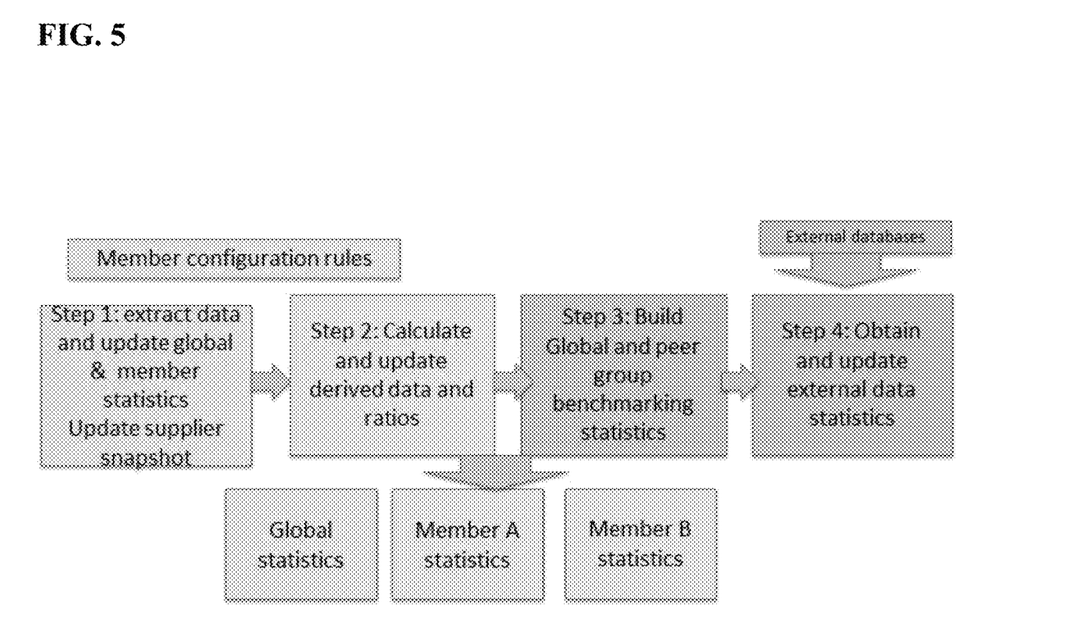
FIG. 5 is a flow chart illustrating the use of data mining tools that can be used in the compliance database and management system of FIG. 1.

FIG. 5 is a flow chart showing use of the one or more data mining tools. At step 1, each data mining tool may extract data from the system and use the extracted data to update global statistics, member statistics, and/or supplier statistics. At step 2, each data mining tool may calculate and update derived data and ratios. The system may store the results of steps 1 and 2 in different formats, including adding the results to global statistics and/or adding the results to individual company user statistics. At step 3, each data mining tool may build global and peer group benchmarking statistics based on the results of steps 1 and 2. At step 4, the system may receive information from one or more external databases, and may update the received external data statistics based on the results of steps 1 and 2.

Referring to FIG. 4, compliance database and management systems of the present technology may also include an assessment database 420. The assessment database 420 may periodically, such as at the end of each month, aggregate all assessment data from each company user and create panels of statistical data for benchmarking. Panels may help company users benchmark and rank their compliance activity against high, medium, and low performance of peers in areas such as team productivity, completeness of their compliance program, and results of their program at suppliers.

Compliance database and management systems of the present technology may generate an academic database 422, using redacted and aggregated audit results generated by each company user.

There can be antitrust risks of direct competitors working together to collaborate on improving conditions at suppliers they share. However, the present disclosure is designed to purposely separate supplier data types into "public" and "private and buyer proprietary information" that must be kept buyer specific for antitrust reasons.

Moreover the present invention is designed to be flexible by allowing clients to easily establish different organizational and supply chain models to their specific processes and terminology through user controlled configuration tools.

The compliance database and management system can scale to support very large communities with an unlimited number of buyers and suppliers and third party supply chain intermediates like agents, licensees, and importers, all controlled through easily defined roles and permission configuration A sophisticated question management library and tools allows for the easy creation of an unlimited number of types of questionnaires to be in use at the same time. For example, a company can create as many questions and questionnaires (question sets) as they want. Each question can be answered using a checkbox, dropdown, textbox, text area, multiple textboxes, date, numeric and/or table format, allowing each company to have as sophisticated scored and/or nested questionnaires as per their requirements.

Data analytics and data mining plays an important role in turning large amounts of raw data into actionable information, and the system described herein has developed useful ways to aggregate compliance data to spot underlying trends and data patterns at the same time redacting any company specific information.

This helps facilitate the productivity of supplier assessors that often have to work in remote locations without reliable Internet connections. The application is designed to be light to load, scale automatically to fit the device in use, and can operate off line using a laptop, tablet or any other electronic device. While offline (e.g., not connected to the internet), all data and information can be saved and stored locally. It can also handle automatic synchronization when an Internet connection is established.

The present disclosure facilitates sharing of information relating to workplace conditions among members to promote transparency in accordance with antitrust and anti-competition guidelines. This results in a global clearinghouse of factory information, allowing members to identify common needs for workplace improvement, prioritize them and attack them together. Collaboration lowers costs, reduces labor load, increases learning, improves leverage and enhances factory performance. However, collaboration and sharing is optional for each member in every regard.

To drive industry-wide collaboration, companies need an organization that is multi-party, market-wide, standards-neutral, mission-oriented, relationship enabling and not bottom-line vested.

Some companies will benefit from access to resources that they will not have on their own. Other companies will benefit from more targeted efforts, uniform implementation in shared facilities and the creation of a level playing field where compliance is neither a competitive advantage nor disadvantage, but rather a baseline. Workers would benefit most if industries were to find an efficient and cost-effective way to monitor and improve their working conditions.

The supply chain compliance sharing platform allows a user to, for example: search factories/farms/workplaces to identify opportunities for collaboration; identify where factories overlap with other members; communicate with other members to initiate collaboration; access shared compliance documents; and share factory/farm/workplace lists and compliance documents anonymously (or not) with other members.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed:

1. A method for performing supply chain compliance, the method comprising:
   collecting supply chain data comprising information about one or more suppliers;
   compiling the supply chain data into a database;
   providing the compiled supply chain data so that the data is accessible to a first company and a second company, each of the first and the second company being different than the one or more suppliers,
      wherein the compiled supply chain data is analyzed, filtered by one or more parameters, organized by one or more parameters, or a combination thereof; and
      wherein the compliance database is configured to dynamically change based on one or more parameters stored in the compliance database; and,
   facilitating collaboration between the first company and the second company via one or both of: allowing the first and second company to collaboratively perform a single joint audit, and execution of a joint corrective action plan for one or more of the suppliers, the corrective action plan being based at least in part on independent audits completed by each of the first and the second company in a facility of the one or more of the suppliers;
   wherein the facilitating collaboration between the first company and a second company includes separating the compiled supply chain data into public supply chain data and private supply chain data, the public supply chain data being accessible by both the first and the second company, and the private supply chain data being accessible by only the first or second company owning said private supply chain data in accordance with antitrust regulations.

2. The method of claim 1, wherein the supply chain data comprises demographic information, facility description information, management information, employee health information, and security information, labor information, or a combination thereof of one or more suppliers.

3. The method of claim 2, wherein the demographic information of the one or more suppliers comprises a geographic location information.

4. The method of claim 3, further comprising mapping the supply chain compliance data based on the geographic location.

5. The method of claim 1, wherein compiling the supply chain data comprises preventing one or more duplicate suppliers based on one or more supplier attributes.

6. The method of claim 1, further comprising implementing one or more codes of conduct to identify one or more suppliers, wherein the code of conduct defines one or more rules that a company implements to identify a supplier.

7. The method of claim 1, further comprising inputting scheduling data into an interactive, virtual calendar, wherein the scheduling data comprises audits, training, supplier meetings, supplier visits, or a combination thereof.

8. The method of claim 1, wherein the step of facilitating collaboration comprises reviewing audit data from the first company and reviewing audit data from the second company.

9. The method of claim 1, further comprising monitoring the supply chain data, wherein the step of monitoring comprises receiving audit result data and generating an action plan based on the audit result data.

10. The method of claim 9, wherein the supply chain data comprises audit data, factory data, audit scheduling data, failed conditions data, length of time to close audits, list of countries, number of active factories, total number of factories, failed conditions data, shared data with another, or a combination thereof.

11. The method of claim 10, wherein the analyzed data is scored according to risk or severity.

12. The method of claim 11, wherein each of the one or more suppliers is ranked by a classification scheme defined by the user.

13. The method of claim 1, wherein the facilitating collaboration between the first company and a second company includes execution of the joint corrective action plan for one or more of the suppliers, the joint corrective action plan being based at least in part on independent audits conducted by each of the first and the second company in a facility of the one or more of the suppliers.

* * * * *